US008878855B2

(12) United States Patent
Casanova et al.

(10) Patent No.: US 8,878,855 B2
(45) Date of Patent: Nov. 4, 2014

(54) VIDEO IN E-MAIL

(75) Inventors: Xavier Casanova, San Jose, CA (US); Walter Rezin Mann, San Francisco, CA (US); Justin Michael Foster, Federal Way, WA (US)

(73) Assignee: Liveclicker, Inc.

( * ) Notice: Subject to any disclaimer, the term of this patent is extended or adjusted under 35 U.S.C. 154(b) by 858 days.

(21) Appl. No.: 12/787,355

(22) Filed: May 25, 2010

(65) Prior Publication Data

US 2011/0037767 A1    Feb. 17, 2011

Related U.S. Application Data

(60) Provisional application No. 61/233,815, filed on Aug. 13, 2009.

(51) Int. Cl.
G06T 13/00     (2011.01)
H04L 12/58     (2006.01)

(52) U.S. Cl.
CPC .............. *H04L 12/58* (2013.01); *H04L 51/066* (2013.01); *H04L 12/5835* (2013.01)
USPC ........................................... 345/473

(58) Field of Classification Search
USPC ........................................... 345/473
See application file for complete search history.

(56) References Cited

U.S. PATENT DOCUMENTS 6,335,985 B1 * 1/2002 Sambonsugi et al. ........ 382/190
7,216,149 B1 * 5/2007 Briscoe et al. ................ 709/217
2007/0140128 A1 * 6/2007 Klinker et al. ................ 370/238
2008/0201751 A1 * 8/2008 Ahmed et al. ................ 725/109
2008/0307475 A1 * 12/2008 Liwerant et al. .............. 725/109
2010/0118190 A1 * 5/2010 Salfati et al. .................. 348/469

OTHER PUBLICATIONS

Berners-Lee, T. "RFC 1866—The x27text/htmlx27 Media Type." RFC 1866. Network Working Group, Nov. 1995. Web. Jul. 15, 2013. <https://tools.ietf.org/html/rfc1866>.*

* cited by examiner

*Primary Examiner* — David Zarka
*Assistant Examiner* — Vu Nguyen
(74) *Attorney, Agent, or Firm* — Han IP Corporation

(57) ABSTRACT

To allow a video clip to be rendered within an e-mail, the video stream is converted into an animated image object (e.g. a GIF (Graphics Interchange Format) object) and stored on a server system. An HTML image element/tag (<img . . . >) is created that references the animated image object at the server, for embedding in a conventional HTML-encoded e-mail message. When the receiving e-mail application processes the HTML encoding, the processing of the HTML image element causes the referenced animated image object to be downloaded and displayed, thereby automatically presenting a recreation of the video stream. To facilitate efficient transmission to the receiving device, the size of the animated image object is preferably optimized before transmission, the optimization including general optimization techniques, as well as optimizations based on the particular characteristics associated with the receiving device and/or the communications link to the receiving device.

51 Claims, 2 Drawing Sheets

VIDEO IN E-MAIL

This application claims the benefit of U.S. Provisional Patent Application 61/233,815, filed 13 Aug. 2009.

BACKGROUND AND SUMMARY OF THE INVENTION

This invention relates to the field of Internet communications, and in particular to a method and system that facilitates the sending of video clips via e-mail.

The increased availability of affordable computer systems, portable video devices, and the like, have provided for ubiquitous presentations of video content material in a variety of contexts. As such, marketing professionals have come to recognize that still images now lack the allure they might once have had, compared to the allure of a video clip. Static billboards and displays are continually being replaced by video display devices; airport terminal passageways, for example, are typically lined with one video screen after another, each displaying a video intended to attract the attention of the passers-by. In like manner, the number of commercial websites having windows presenting video advertisements is also increasing.

The use of video in e-mail marketing, however, is significantly lagging behind the use of video in other marketing arenas. The cause of this lag is multi-faceted, due primarily to the secondary effects of the current technology constraints and security issues associated with e-mail.

A common method for transmitting video content via e-mail is to attach the video file to an e-mail message. Among friends and colleagues, this is a fairly effective technique, because the recipient of the e-mail is likely to have an interest in viewing the attached file, and will perform the necessary actions to launch a viewer that renders the content of the file. Among advertisers and potential customers, such an interest would be rare, and most of the recipients of an advertisement video are not likely to purposely initiate a playback of the advertisement.

An alternative to attachment is to embed the video in the form of an executable program, such as Flash code, in the e-mail message. However, due to the potential for introducing malicious programs, most e-mail applications do not support the automatic execution of an embedded program, and particularly the execution of files that may contain embedded scripts. This problem may be overcome in the future by creating a video format and application that precludes the embedding of malicious software, but this solution requires the establishment of an agreed upon standard, as well as a modification to each e-mail application to support such a standard.

Another alternative is to provide an embedded image in the e-mail message, with a hyper-link to the video, so that when the user activates the hyper-link, e.g. by clicking on the image, a browser program displays the video. Although the presentation of the static image associated with the video may be more attractive than the e-mail application indicating that a video file is attached to the message, and does not consume the bandwidth for transmitting the video until the user activates the link, it still requires the user to initiate the rendering, which severely limits its effectiveness for video advertisement, as discussed above.

It would be advantageous to enable automated rendering of video clips when a user views an e-mail. It would also be advantageous to enable this automation without modifying existing e-mail applications. It would also be advantageous to provide an efficient process for embedding video clips in an e-mail. It would also be advantageous to optimize the bandwidth used to effect the rendering of the video clips. It would also be advantageous to optimize the video format for the device that renders the video clips.

These advantages, and others, can be realized by a method and system that converts a video stream into an animated image object, such as a GIF (Graphics Interchange Format) object, and embeds a reference to the animated image as an image element/tag in a conventional HTML-encoded e-mail message. When the receiving e-mail application processes the HTML encoding, the processing of the HTML image element (<img . . . >) causes the referenced animated image object to be downloaded and displayed, thereby automatically presenting a recreation of the video stream. To facilitate efficient transmission to the receiving device, the size of the animated image object is preferably optimized before transmission, the optimization including general optimization techniques, as well as optimizations based on the particular device receiving the animated image object.

As noted above, conventional e-mail applications do not support rendering of a video clip within an e-mail message. However, the applicants have recognized that virtually all e-mail applications support the rendering of image elements in an HTML-encoding of a received e-mail, and, included within the standard definition of an HTML image element are animated image objects, including GIF, APNG (Animated PNG), MNG (Multiple-image Network Graphics), and other objects.

Although utilities are available for using conventional video streams (e.g. avi, mpg, wmv, and so on) to create animated image objects, these utilities do not necessarily facilitate the creation of a custom-designed animated image that is suitable for inclusion in an e-mail marketing message. That is, a creator of a marketing brochure will be able to define the size of the image, the placement of the image within the advertisement, and so on, but may not be fluent in the techniques needed to be employed to convert a video image into an animated image object that will be embedded into the e-mail advertisement at the appropriate size and placement.

Even if the creator of an e-mail advertisement is fluent in the techniques necessary to create an appropriate animated image, a broadcast of the advertisement to a broad audience is likely to result in the advertisement being delivered to a variety of different devices, with differing display capabilities. Sending the same animated image object to each of the variety of devices can be very inefficient, and could lead to recipients automatically discarding/refusing messages from the advertiser. Sending an 800×600 pixel image to an ipod with a resolution of 320×240 pixels consumes over six times the bandwidth required to render the image. Similarly, sending a 320×240 image to a 1280×1024 display will produce a very 'blocky' image that would likely adversely affect the recipients' reaction to the advertisement. In like manner, sending a high resolution image via a broadband link may be feasible, but sending that same image via a low-speed modem link would be impractical. In a preferred embodiment of this invention, a variety of versions of the animated image corresponding to the video stream are created, each optimized for a particular set of receiver characteristics.

In addition to being able provide a variety of versions of the animated image representation of the video stream, the use of a server system for delivering the animated images in response to each recipient's opening of the message provides a means for determining how many copies of the animated image have actually been sent to the addressees of the e-mail message.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

The invention is presented using the paradigm of creating an e-mail advertisement that is rendered at a recipient's device as an e-mail message with an embedded video clip, the rendering of the video clip being automatically performed when the e-mail message is opened. One of skill in the art will recognize that the principles presented herein are not limited to this particular application of the invention, and can be used for embedding video clips in e-mail messages regardless of the context for the creation and rendering of such e-mail messages. As noted above, a variety of formats are available for creating and communicating animated image objects, including GIF, APNG, MNG, and others. For ease of reference, the invention is presented using the example GIF format, and embedding references to these GIF objects (hereinafter "GIFs") in the "IMG" tag of an HTML e-mail message. One of skill in the art will recognize that the principles of this invention are not limited by the particular format used to encode the animated image, nor by the particular technique used to reference such an animated image object.

Figure 1:
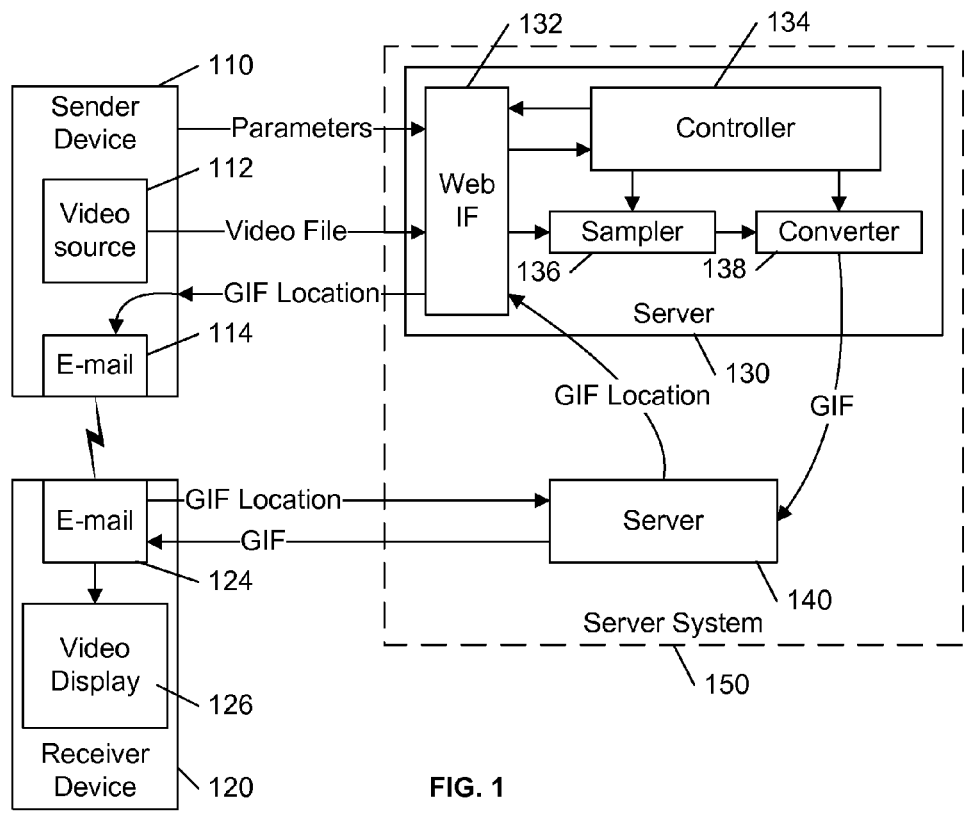
FIG. 1 illustrates an example block diagram of an embodiment of a video e-mail system in accordance with this invention.

FIG. 1 illustrates an example block diagram of an embodiment of a video e-mail system in accordance with this invention. In this embodiment, a sender device 110 interacts with a server system 150, typically via a web-page on the Internet, to create a customized animated GIF from a video stream/file for embedding in an e-mail message.

A server 130 within the server system 150 is configured to provide a web-page to a user at the sender device 110 to facilitate the creation of the GIF, based on creation parameters provided by the user. The creation parameters include, for example, a size of the GIF, the animation speed (frames per second), the animation duration, a color-depth, cropping, and so on. The creation parameters may also refer to advertisement-specific parameters, such as where the GIF is to be placed in the ad, whether the advertisement is placed before, during, or after the video is rendered (pre-roll, mid-roll, post-roll), and so on. As discussed further below, these advertisement-specific parameters do not necessarily affect the conversion of the video to GIF, but are used in the creation of a set of commands for appropriately embedding the GIF in the particular e-mail advertisement.

Based on the user provided creation parameters, a controller 134 determines an appropriate sampling rate and resolution for extracting frames for encoding by the sampler 136. Video sampling to modify frame rate is common in the art, and any of a number of known techniques may be used. For example, if the frame rate of the input video is 30 frames per second, and the user defines the GIF frame rate to be 15 frames per second, the controller may control the sampler to ignore every other frame, or to create an interpolation of every two frames, or to create an interpolation across a given number of frames and provide an output every 1/15 of a second, and so on.

Each sampled/created frame is used by a converter 138 to create each frame of an animated GIF, using techniques common in the art. If the user parameters include a resolution change, or a cropping, these operations will either be performed by the sampler 136 to produce a video frame corresponding to these parameters, by the converter 138 to produce a GIF corresponding to these parameters, or by a combination of operations in both the sampler 136 and converter 138. In general, cropping is preferably performed early in the process, and resolution scaling is preferably performed late in the process.

When the GIF corresponding to the video stream is produced, based on user-provided creation parameters, it is stored within the server system 150. In this example, the GIF is stored on a different server 140 from the interaction server 130 within the server system 150, although it may be stored anywhere that it can subsequently be retrieved from, including the same server 130.

When the GIF is created and stored, the server 130 communicates the location that the GIF is stored to the sender device 110. As part of the user interaction with the server system 150, the user at the device 110 is preferably provided the option of viewing the created GIF before inclusion of the reference to the GIF in an e-mail message.

The location of the GIF is preferably communicated to the user as text that can be pasted directly into an e-mail message and sent to a receiver device 120. In a preferred embodiment, the text corresponds to an image element in HTML format, such as:

<img src="[the GIF location]" height="100" width="90"> where the GIF location is provided as a URL address. The height and width parameters instruct the HTML processor in the receiving e-mail program 124 to place the image in a block that is 100 pixels high by 90 pixels wide.

Of particular note, all of the common e-mail applications support the HTML format, and if the user of the receiver device 120 has enabled rendering of HTML formatted e-mails, the above HTML code will automatically cause the HTML processor to obtain the image that is located at the specified source (src) location and place it within the 100×90 pixel block within the rendered e-mail message when the message is opened[1]. Because the referenced image at the source is the animated GIF at the server 140 corresponding to the original video stream at the source 112, the rendering in the e-mail message will appear to be a playback of the original video stream on the video display 126. Due to the automatic nature of the HTML processing of image elements, this video playback will occur without any actions on the part of the receiver of the e-mail, other than to open the e-mail message with image rendering enabled.[1]

[1] Some e-mail applications, such as Thunderbird, can be configured to block the automatic rendering of remote images, and require explicit user authorization to open images in a message. Once the authorization is provided, all images within the message are rendered, without a specific selection of each.

Figure 2:
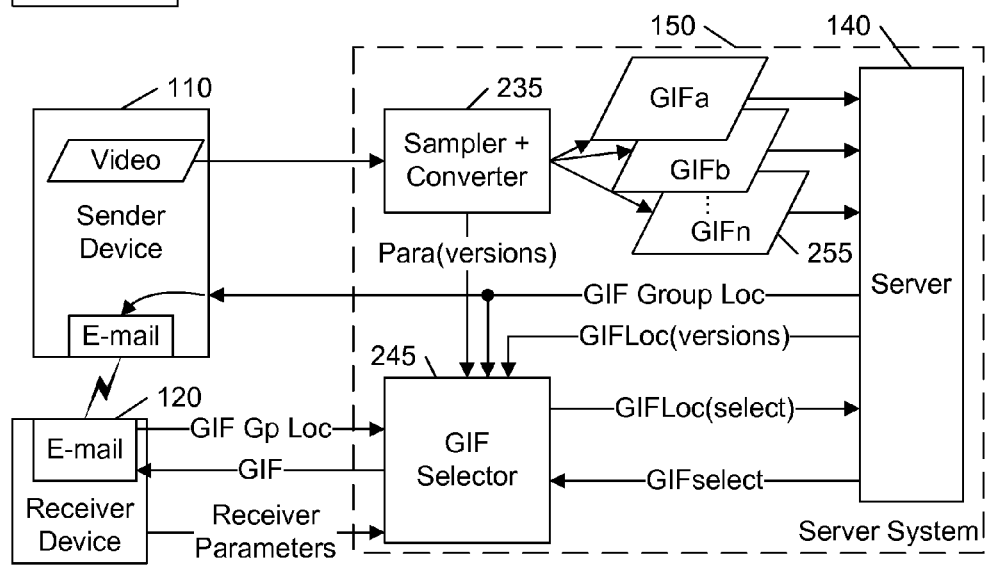
FIG. 2 illustrates an example block diagram of another embodiment of a video e-mail system in accordance with this invention.

FIG. 2 illustrates an example block diagram of another embodiment of a video e-mail system in accordance with this invention. In this embodiment, multiple versions 255 of the GIF are created and stored, each version corresponding to a different combination of sampling and conversion parameters. These different versions are created to be suitable for receivers having different capabilities, or coupled via different types of communication channels. For example, the versions may include different frame rates, different resolutions, different color-depth, different image file formats, and so on.

In this embodiment, instead of providing a location that references a particular GIF, the reference will be to the group of GIFs corresponding to the source video. This group location will be included in the e-mail sent from the sending device 110 to the receiving device 120. When the HTML processor initiates the process of requesting a download from this location, a GIF selector 245 at the server identified by this group location is configured to select an appropriate version of the GIF to send to the receiver device 120, based on parameters relating to the receiver and/or the receiving channel, using conventional HTTP redirection. In this manner, for example, a receiving device 120 having a small display will be redirected to a lower resolution GIF than a receiving device having a large display, a device 120 coupled to the server system 150 via a high-speed connection will be directed to a GIF with a higher frame rate than a device coupled via a low-speed connection, and so on.

One of skill in the art will recognize that by using redirection, the GIFs can be provided from any of a variety of servers, thereby offloading the task of actually providing the GIF from the server system that is initially in communication with the e-mail client. This use of other servers can also be structured for optimal delivery efficiency, based on, for example, the location of the e-mail client, available routes to the client, and so on.

Figure 3A:
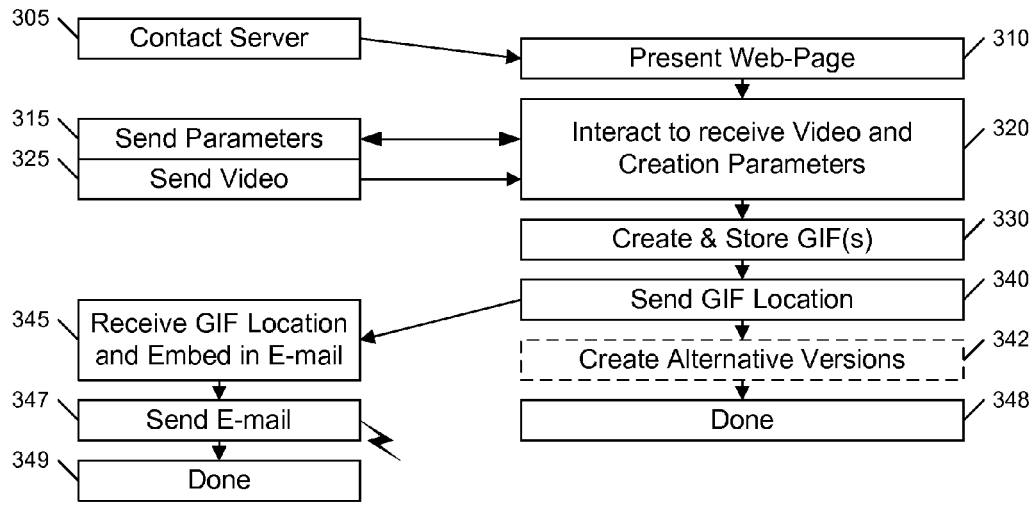
FIGS. 3A-3B illustrate an example flow diagram of an embodiment of an video e-mail system in accordance with this invention.
Figure 3B:
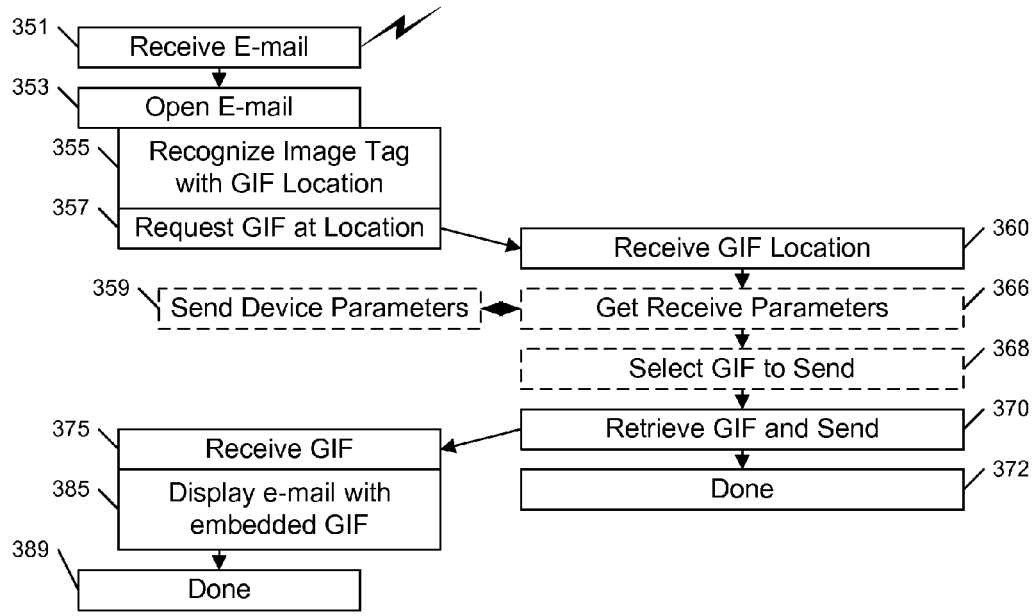

FIGS. 3A-3B illustrate an example flow diagram of an embodiment of a video e-mail system in accordance with this invention. FIG. 3A illustrates an example flow between the originator of the video e-mail message and the server system, and FIG. 3B illustrates an example flow between a recipient of the video e-mail message and the server system.

At 305, the originator contacts the server system, typically by accessing a web-page 310 of the provider of the video e-mail service. Upon access and registration, the server interacts with the originator, at 320, to receive the video that is to be converted into an animated GIF, as well as user-defined parameters for performing this conversion.

In a preferred embodiment, a 'browse' window is provided to allow the user to identify the video file to be used for creating the animated GIF, and options are provided for the creation of the GIF, preferably including the following options:

a) The desired length of the email video clip, in seconds;
b) A start time for the video clip, allowing the user to skip the first few seconds of a video and start the video clip for the email at a select different time;
c) To facilitate access to the full/original video via the recipient's browser, or to enable any other subsequent operation, a play button or graphic containing a link to the original video or other material may be overlaid on the video clip while the animation is playing; in addition to conventional symbols for initiating playback or other options, the graphic can be any other type of image, such as a user-defined logo or other symbol;
d) The location of the play button or graphic on the video; using a very simple drag-n-drop interface, the user can exactly place the button or graphic on the video clip;
e) The color-depth for the image (16, 32, 64, 128, 256 colors, or grayscale); this setting configures the maximum number of allowed colors for each frame in the animation;
f) A "post-roll" image; sometimes users want to add a static image at the end of the video clip, such as a promotional message, a call to action, or merely a dark screen;
g) The length of the "post-roll" image, if applicable; if the user has decided to add a post-roll image at the end of the clip, for how long should this static image be visible to the user;
h) Image brightening: if the video is too dark, the user can choose to make it brighter by selecting this option;
i) Looping option. Animated GIFs can automatically "loop", meaning that the animation can be set to perpetually restart playing when it reaches the end; the user can decide to turn looping ON or OFF, depending on the needs;
j) Image optimization; the user can decide to turn ON or OFF additional optimizations, detailed further below;
k) Dimensions for the video clip; using a slider, the user can set the desired height and width for the video clip; and
l) Final cropping; if the video clip needs to be cropped to an exact height and width, an outline cropper is provided.

At 330, the system creates the frames that will form the animated GIF, using any of a variety of video manipulation tools, such as FFMPEG or M-ENCODER, to extract frames from the video based on the user-provided creation parameters. The number of frames will be dependent upon the selected duration and frame rate of the clip. If the user has selected to add a post-roll image, a set of frames corresponding to this subsequent image will be added to the clip.

If the user has selected to brighten the image, overlay a button or image, clip the image, etc., each of the frames is appropriately processed to perform the desired operation. In a preferred embodiment, an image processing application, such as ImageMagick, is used to perform these operations.

In a preferred embodiment, the created GIF is optimized to reduce the bandwidth required to send the GIF. One such optimization takes advantage of the use of 'transparent' GIFs that are overlaid on top of an 'opaque' GIF. The frames are processed to identify a background image that remains substantially constant for an extended duration in the clip, and each of the frames are processed to identify the differences from this background image. The background image is encoded once as a static 'opaque' GIF, and each of the other frames is encoded as dynamic transparent GIFs using their differences from the background image as an overlay. In this manner, regions of each frame that do not differ from the background image are not encoded in the created GIF. The aforementioned ImageMagick application provides for such optimization.

Another optimization is the elimination of redundant frames, by controlling the duration that each frame is displayed. If an immediately subsequent image is identical, or very similar to the preceding image, the duration of the preceding image is extended, rather than encoding substantially the "same" image twice.

Other optimization techniques may be used to improve the apparent quality of the resultant GIF. Because the GIF will generally be rendered at a relatively slow frame rate, compared to conventional video, which is rendered at a frame rate that causes the human visual system to blend the sequential images, adding such blending to the GIF will generally produce a more visually appealing rendering.

In like manner, because the number of colors in the 'palette' used to render the GIF will generally be limited, the choice of colors forming the palette can have a significant effect on the perceived quality. Techniques are commonly available for optimizing the color selection by choosing the colors based on the colors present in the original image, and by adding each detected color to the palette while avoiding the addition of colors that are only slightly different from colors already present in the palette. Alternatively stated, the colors in the preferred palette will be colors in the video frame that have the largest gradient from other colors in the video clip. Along these lines, instead of sending multiple palettes as the video scenes change, the entirety of the clip can be processed to select a single palette that is suitable for use for a significant portion of the clip, thereby reducing the amount of data needed to encode the animated GIF.

When the creation process is completed, the GIF is stored, and the location of the stored GIF is communicated to the user, at 340. Preferably, the user is provided the opportunity to view the created GIF, and re-enter the interaction process until the created GIF is suitable. The location of the suitable GIF is subsequently included in user's e-mail message, at 345. As noted above, the location is preferably communicated to the user as an HTML image element/tag that can be directly embedded in the user's e-mail message without further user involvement with the element/tag.

Upon sending one or more e-mails with the embedded image element that references the location of the created GIF, the user may terminate the process, at 349.

As discussed above with respect to FIG. 2, a plurality of GIFs may be created to accommodate differences among receivers and receiving channels. These alternative versions may preferably be created as a follow-on process, at 342, after the user has completed the creation of a suitable GIF. Generally, the user-accepted GIF will be the preferred version to send to recipients of the e-mail, generally suitable for rendering on a PC or laptop with a mid to high speed connection with the server system and a high-speed browser, whereas the other versions will be sent to receivers with less capability than these recipients of the preferred version.

For example, in addition to the aforementioned differences with regard to screen size and connection speed, the preferred version may be created for rendering at 15 fps, which some e-mail applications support very well, while other applications are limited to 8-10 fps. In like manner, the preferred version will be whatever size the user selected, but some applications perform poorly if the horizontal size exceeds a particular limit. Similarly, some applications initiate the rendering of a GIF as soon as the first few frames arrive, while others do not initiate the rendering of a GIF until the entire GIF is downloaded.

In a preferred embodiment of this invention, the characteristics and limitations of each of the most popular applications and systems are determined, and a set of GIF versions are created to be rendered effectively and efficiently by each corresponding application and system. In an embodiment that includes multiple versions that are created after the server communicates the location of the preferred version of the GIF to the user, this location serves as the "GIF Group Location" referenced above, the reference to the location being redirected to the GIF selector 245 of FIG. 2.

Upon completion of the creation of multiple versions, if any, of the animated GIF, the server system terminates its processing of the user's requests, at 348.

At some time later, an addressee of the video e-mail message receives the message, at 351. Upon opening the e-mail message, at 353, the HTML processor in the e-mail application processes the HTML version of the e-mail message, recognizes the HTML image element/tag that identifies the location of the animated GIF, at 355, and correspondingly automatically requests a download of the referenced image, at 357.

The server system receives the request for the GIF at the referenced location, at 360, and sends the requested GIF at 370.

Optionally, in a preferred embodiment that includes customized versions of the GIF to accommodate different receivers and receive channels, the server system is configured to process the request for the GIF to select an appropriate version based on the characteristics of the receiver and/or receiver channel, at 366-368.

At 366, the server system acquires the receiving device parameters, typically based on information included in HTTP headers. Determining the characteristics of the receiving channel, on the other hand, generally requires measuring the time consumed in the download of a given amount of data to the receiving device.

When the request for the e-mail clip is received at the server, the server needs to promptly select the appropriate version of the video clip, to avoid a noticeable delay that may serve to annoy the recipient. Under such constraints, there is no opportunity to assess the recipient's bandwidth on such a fast transaction, because very few bytes are exchanged in the redirection process between the receiver and the server system.

In a preferred embodiment of this invention, to measure the connection speed and redirect the email client to the proper version of the animated GIF, the server system initiates an action that causes the email client to receive data from the server system and respond, before the server redirects the client to the appropriate GIF. Given the time that the server system sent the data, the amount of data sent, and the time of receipt of the client's response, the server system can estimate the connection speed. One of skill in the art will recognize that any of a variety of techniques can be used to effect this process. For example, the e-mail message may contain a reference to a test image object of a known size before the reference to the actual animated image object, and the time between the requests for the test image and the actual animated image object can be used to estimate the connection speed.

In a preferred embodiment, upon receiving the request for the GIF, the server sends a "heavy redirect" (e.g. a '302 Redirect' response that is padded with unused HTTP response header information) to the e-mail client, wherein the client is redirected to an alternate address on the server system. Based on the size of the "heavy redirect", the time of sending the redirect, and the time that the client contacts the server system at the alternate address, the connection speed can be estimated. Optionally, this redirecting process can be repeated as necessary for the server system to be confident that the estimated speed is correct. For example, if the initial redirect indicates a very low speed, a second redirect may be initiated, to assure that the initial low speed estimate was not an anomaly caused by other factors, such as initial routing delays.

When the connection speed is determined, it is used, with other receiver-related parameters, to select the appropriate version of the GIF to redirect to the recipient, and a redirect response to this version of the GIF is sent back to the e-mail client. If the first redirect does not occur within a given time-out limit (typically in the order of two seconds or so), it is assumed that the receiver connection is slow and/or unreliable, and the request for the animated GIF is redirected to a low-bandwidth version of the email clip.

The client receiver receives the selected GIF, at 375, displays the animated GIF within the e-mail, at 385, and terminates the process, at 389. As is particularly apparent, using the principles disclosed herein, an optimized version of the animated GIF for the recipient's device is received and displayed on the recipient's device with minimal overt activity on the part of the recipient.

Because the presentation of each GIF is initiated by a request from the e-mail client to the provider's server system for the GIF, the provider has the opportunity to collect statistics regarding the number and/or frequency of requests, the types of devices requesting the GIF, and so on.

Of particular note, in a preferred embodiment of this invention, statistics are provided relating to the duration of viewing of the GIF, which generally provides a measure of interest in the video content of the GIF. If the e-mail recipient views the entire GIF animation, this would generally indicate that the recipient found the presentation to be interesting, or at least entertaining Conversely, if the recipient terminates the GIF animation before its end, for example by 'clicking away' or closing the e-mail, this would generally indicate that the recipient had no interest in the subject matter, or that the presentation of the subject matter was poor. A histogram of viewing durations, as measured by the number of bytes sent before the connection was closed is preferably used to provide these statistics.

As noted above, in a preferred embodiment of this invention, the actual delivery of the GIF is offloaded to distributed servers. Commonly, a third-party content delivery network is used to optimize the actual delivery of the GIF, and, unless the third-party provides this information, the provider's server system cannot determine the duration of viewing of the GIF. In like manner, even if the provider is providing the delivery service directly, the overhead and inherent inefficiencies associated with monitoring the viewing duration may preclude such monitoring.

In a preferred embodiment of this invention, a portion of the requests for the GIF are monitored by the provider's server system, thereby allowing the provider to sample the GIF viewing durations. If the quantity of GIF requests is relatively high, as would be expected in an e-mail advertisement campaign, a small sampling (e.g. one monitored delivery per hundred GIF requests) will generally be sufficient to characterize the viewing durations; if the quantity of GIF requests is low, on the other hand, a larger sampling proportion will generally be used to provide a reliable estimate of the viewing duration characteristics. If the provider is using a third party content delivery network, the non-selected GIF requests are redirected to the content delivery network, while the selected GIF requests are handled directly by the provider's server system, thereby allowing the provider to monitor the GIF viewing duration for each selected GIF request.

Preferably, the viewing duration is monitored by transmitting the GIF in a 'throttled' manner, at a speed that is slightly faster than the rate at which the GIF is played on the e-mail client. In this manner, there will only be a slight difference between the amount of data transmitted and the amount of animation viewed. For example, if an animated image is 300 kb in size, and is 30 seconds long, then the client will consume 10 kb per second while playing the clip, and the server system will be configured to send the animated image at slightly more than 10 kb/second (e.g. 10.1 kb/second). If the e-mail recipient closes the window in which the image is displayed before it has been completely downloaded, the e-mail client will close the connection to the server system. If, in this example, the connection is closed after sending 100 kb, it can be assumed that the e-mail recipient viewed about a third (100 kb/300 kb) of the animation (10 seconds). It is significant to note that, because the measure is relative to the speed and size of the animation, this measurement technique is independent of the connection speed.

The foregoing merely illustrates the principles of the invention. It will thus be appreciated that those skilled in the art will be able to devise various arrangements which, although not explicitly described or shown herein, embody the principles of the invention and are thus within its spirit and scope. For example, one of skill in the art will recognize that the different processes detailed above may be selectively performed and/or performed in a different sequence than presented herein. As detailed above, the determination of connection speed and subsequent redirection to the appropriate version is performed when the initial request is received. However, a more dynamic embodiment may include an ongoing assessment of delivery speed can be performed by the server that is delivering the GIF, and subsequent redirections to more appropriate versions, as required. These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming) embodied on computer-readable media, and any combination thereof;
f) hardware portions may be comprised of one or both of analog and digital portions;
g) hardware portions may include a processor, and software portions may be stored on a computer-readable medium, and may be configured to cause the processor to perform some or all of the functions of one or more of the disclosed elements;
h) any of the disclosed devices or portions thereof may be combined together or separated into further portions unless specifically stated otherwise;
i) no specific sequence of acts is intended to be required unless specifically indicated; and
j) the term "plurality of" an element includes two or more of the claimed element, and does not imply any particular range of number of elements; that is, a plurality of elements can be as few as two elements, and can include an immeasurable number of elements.

We claim:
1. A server system comprising:
a transceiver system that is configured to communicate with a plurality of user devices; and
a processing system, operably coupled to the transceiver system, that is configured to:

receive video content and creation parameters from a first user device, convert the video content into a plurality of HyperText Markup Language (HTML)-supported animated image objects based on the creation parameters, store the plurality of HTML-supported animated image objects at a memory location, transmit a reference to the plurality of HTML-supported animated image objects to the first user device for inclusion in an HTML image element (IMG) of an e-mail message, in response to an automated processing of the IMG in the e-mail message, receive a request for the video content from a second user device that receives the e-mail message from the first user device, determining one or more parameters of a receiving channel associated with the second user device based on a Hypertext Transfer Protocol (HTTP) header of the request, selecting, based on the one or more parameters of the receiving channel associated with the second user device, a certain HTML-supported animated image object from the plurality of HTML-supported animated image objects such that a channel response time of the certain HTML-supported animated image object from the first user device to the second user device less than a predetermined time period, and transmit the certain HTML-supported animated image object to the second user device.

2. The server system of cairn 1, wherein the processing system is configured to convert the video content by a process that includes creating a preliminary image object based on the video content and the creation parameters, and reducing a size of the preliminary image object to create an animated image object of the plurality of HTML-supported animated image objects.

3. The server system of claim 1, wherein the processing system is further configured to:

determining one or more device parameters associated with the second user device, and wherein the one or more device parameters include at least one of a connection speed or a frame speed.

4. The server system of claim 3, wherein the device parameters include one or more application-specific parameters.

5. The server system of claim 1, wherein the processing system is further configured to:

provide a redirect response upon receiving the request for the video content, and determine the channel response time based on receiving a redirected request.

6. The server system of claim 1, wherein the processing system is further configured to convert the video content by creating one or more static image objects and one or more dynamic image objects to create the plurality of HTML-supported animated image objects.

7. The server system of claim 6, wherein at least one of the static image objects includes a background image, and each of the one or more dynamic age objects is based on differences from the background image.

8. The server system of claim 6, wherein the static image objects include an associated time duration during which at least a portion of video content is substantially constant.

9. The server system of claim 1, wherein the processing system is further configured to perform a blending among frames of an individual HTML-supported animated image object of the plurality of HTML-supported animated image objects.

10. The server system of claim 1, wherein the processing system is further configured to optimize a selection of colors used to encode frames of the plurality of HTML-supported animated image objects.

11. The server system of claim 1, wherein the processing system is further configured to facilitate control of brightness of one or more of frames of plurality of HTML-supported animated image objects.

12. The server system of claim 1, wherein the processing system is further configured to provide a graphic symbol with the plurality of HTML-supported animated image objects, and selection of the graphic symbol by the second user causes an associated action to be performed.

13. The server system of claim 1, wherein the plurality of HTML-supported animated image objects are encoded using one of: GIF, APNG, and MNG.

14. The server system of claim 1, wherein the processing system is further configured to maintain an accounting of requests for the plurality of HTML-supported animated image objects, and to provide one or more reports based on the accounting.

15. The server system of claim 1, wherein the creation parameters include a frame rate.

16. The server system of claim 1, wherein the creation parameters include a duration of an individual of HTML-supported animated image object of the plurality of HTML-supported animated image objects.

17. The server system of claim 1, wherein the creation parameters include one or more of: color-depth, static post-roll, play button, cropping, and placement.

18. The server system of claim 1, wherein the processing system is further configured to:

receive multiple requests for the plurality of HTML-supported animated image objects, and provide statistics based on these requests.

19. The server system of claim 18, wherein the statistics are based on one or more of: a number of the requests, a frequency of the requests, and characteristics of requesting devices.

20. The server system of claim 18, wherein the statistics are based on a duration of viewing of an individual HTML-supported animated image object of the plurality of HTML-supported animated image objects.

21. The server system of claim 18, wherein the statistics are based on an amount of data transmitted in response to the requests.

22. A method comprising:

receiving, at a server system, video content and creation parameters from a first user device;

converting, at the server system, the video content into a plurality of image objects, based on the creation parameters;

storing, at a memory system, the plurality of image objects at a memory location, the plurality of image objects comprising a plurality of HyperText Markup Language (HTML) animated image objects;

sending, from the server system, a reference to the plurality of image objects to the first user device for inclusion of the reference in an HyperText Markup Language (HTML) image element (IMG) of an e-mail message that is sent from the first user device to a second user device;

in response to a determination a processing of the IMG at the second user device, receiving, at the server system, a request for the video content from the second user device that receives the e-mail message from the first user device the reference to the memory location;

determining one or more parameters of a receiving channel associated with the second user based on a Hypertext Transfer Protocol (HTTP) header of the request;

selecting, based on the one or more parameters of the receiving channel associated with the second user device, a certain image object from the plurality of image objects such that a channel response time of the certain image object from the first user device to the second user device is less than a predetermined time period; and sending, from the server system, the certain image object to the second user device.

23. The method of claim 22, wherein converting the video content includes creating a preliminary image object based on the video content and the creation parameters, and reducing a size of the preliminary image object to create an image object of the plurality of image objects.

24. The method of claim 22, further comprising:
determining one or more parameters associated with the second user, wherein device parameters include at least one of an application-specific parameter, a connection speed, or a frame speed.

25. The method of claim 22, further comprising:
providing a redirect response upon receiving the request for the plurality of image objects, and determining a channel response time based on receiving a redirected request, wherein the selecting, based on the one or more parameters of the receiving channel associated with the second user device, the certain image object from the plurality of image objects selecting the certain image object from the plurality of image objects based on the determined channel response time.

26. The method of claim 22, wherein converting video content includes creating one or more static image objects and one or more dynamic image objects to create the plurality of image objects.

27. The method of claim 22, including blending among frames of the plurality of image objects.

28. The method of claim 22, including maintaining an accounting of requests for the plurality of image objects, and providing one or more reports based on the accounting.

29. The method of claim 22, wherein the creation parameters include one or more of: frame rate, duration, colordepth, static post-roll, play button, cropping, and placement.

30. The method of claim 22, including receiving multiple requests for the plurality of image objects and providing statistics based on these requests.

31. The method of claim 30, wherein the statistics are based on one or more of: a number of the requests, a frequency of the requests, a duration of viewing of an individual image object of the plurality of image objects, an amount of data transmitted in response to the requests, and characteristics of requesting devices.

32. A non-transitory computer readable medium that includes software that, when executed, is configured to cause a processor to:
receive video content and creation parameters from a first user device;
convert the video content into a plurality of HyperText Markup Language (HTML) image objects, based on the creation parameters, the plurality of HTML image objects comprising a plurality of HTML animated image objects;
store the plurality of HTML image objects at a memory location;
transmit a reference to the plurality of HTML image objects to the first user device for inclusion in an HTML image element (IMG) of an e-mail message that is sent from the first device to a second user device;
in response to a determination a processing of the IMG at the second user device, receive a request for the video content from the second user device that receives the e-mail message from the first user device;
determine one or more parameter of a receiving channel associated with the second user device based on a Hypertext Transfer Protocol (HTTP) header of the request;
select, based on the one or more parameters associated with the second user device, a certain HTML image object from the plurality of HTML image objects such that a channel response time of the certain image object from the first user device to the second user device is less than a predetermined time period; and
transmit the certain HTML image object to the second user device.

33. The medium of claim 32, wherein the software causes the processor to convert the video content by a process that includes creating a preliminary image object based on the video content and the creation parameters, and reducing a size of the preliminary image object to create the plurality of HTML image objects.

34. The medium of claim 32, wherein the software causes the processor to determine device parameters associated with the second user device, and wherein the selecting, based on the one or more parameters associated with the second user device, the certain HTML image object from the plurality of HTML image objects comprises selecting the certain HTML image object from the plurality of HTML image objects based on the device parameters associated with the second user device.

35. The medium of claim 34, wherein the device parameters include at least one of a connection speed or a frame speed.

36. The medium of claim 32, wherein the device parameters include one or more application-specific parameters.

37. The medium of claim 32, wherein the software causes the processor to:
provide a redirect response upon receiving the request for the plurality of HTML image objects, and
determine a channel response time based on receiving a redirected request, wherein the selecting, based on the one or more parameters associated with the second user device, the certain HTML image object from the plurality of HTML image objects comprises selecting the certain HTML image object from the plurality of HTML image objects based on the determined channel response time.

38. The medium of claim 32, wherein the software causes the processor to convert the video content by creating one or more static image objects and one or more dynamic image objects to create the plurality of HTML image objects.

39. The medium of claim 38, wherein at least one of the static image objects includes a background image, and each of the one or more dynamic image objects is based on differences from the background image.

40. The medium of claim 38, wherein the static image objects include an associated time duration during which at least a portion of video content is substantially constant.

41. The medium of claim 32, wherein the software causes the processor to perform a blending among frames of the plurality of HTML image objects.

42. The medium of claim 32, wherein the software causes the processor to optimize a selection of colors used to encode frames of the plurality of HTML image objects.

43. The medium of claim 32, wherein the software causes the processor to facilitate control of brightness of one or more of frames of the plurality of HTML image objects.

44. The medium of claim 32, wherein the software causes the processor to provide a graphic symbol with the plurality of HTML image objects, and selection of the graphic symbol by the second user device causes an associated action to be performed.

45. The medium of claim 32, wherein the plurality of HTML image objects are encoded using one of: GIF, APNG, and MNG.

46. The medium of claim 32, wherein the software causes the processor to maintain an accounting of requests for the plurality of HTML image objects, and to provide one or more reports based on the accounting.

47. The medium of claim 32, wherein the creation parameters include at least one of: frame rate, duration of an individual HTML image Object of the plurality of HTML image objects, color-depth, static post-roll, play button, cropping, and placement.

48. The medium of claim 32, wherein the software causes the processor to receive multiple requests for the plurality of HTML image objects, and to provide statistics based on these requests.

49. The medium of claim 48, wherein the statistics are based on one or more of: a number of the requests, a frequency of the requests, and characteristics of requesting devices.

50. The medium of claim 48, wherein the statistics are based on a duration of viewing of an individual HTML image object of the plurality of HTML image objects.

51. The medium of claim 48, wherein the statistics are based on an amount of data transmitted in response to the requests.

* * * * *